US006681052B2

(12) United States Patent
Luna et al.

(10) Patent No.: US 6,681,052 B2
(45) Date of Patent: Jan. 20, 2004

(54) METHODS AND SYSTEMS FOR PERFORMING INVERSE QUANTIZATION AND INVERSE WEIGHTING OF DV VIDEO

(75) Inventors: Amelia Carino Luna, San Jose, CA (US); Jason Naxin Wang, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 429 days.

(21) Appl. No.: 09/764,320

(22) Filed: Jan. 16, 2001

(65) Prior Publication Data

US 2002/0012470 A1 Jan. 31, 2002

Related U.S. Application Data

(60) Provisional application No. 60/176,257, filed on Jan. 15, 2000.

(51) Int. Cl.[7] .............................. G06K 9/36; H04B 1/66
(52) U.S. Cl. ................. 382/250; 382/251; 375/240.24; 375/240.2
(58) Field of Search .................................. 382/173, 232, 382/233, 248, 250, 251; 375/240.03, 240.2, 240.18, 240.22, 240.24

(56) References Cited

U.S. PATENT DOCUMENTS

| 5,455,629 A | * | 10/1995 | Sun et al. .............. 375/240.27 |
| 5,724,097 A | * | 3/1998 | Hibi et al. .............. 375/240.04 |
| 6,172,621 B1 | * | 1/2001 | Iwata .......................... 341/50 |
| 6,348,945 B1 | * | 2/2002 | Hayakawa ............. 375/240.18 |
| 6,389,171 B1 | * | 5/2002 | Washington ................ 382/233 |
| 6,507,614 B1 | * | 1/2003 | Li .......................... 375/240.03 |

* cited by examiner

Primary Examiner—Andrew W. Johns
Assistant Examiner—Amir Alavi
(74) Attorney, Agent, or Firm—Finnegan, Henderson, Farabow, Garrett & Dunner, L.L.P.

(57) ABSTRACT

In methods and systems consistent with the present invention, the process of inverse quantization is performed by determining class number and quantization number for each block of received quantized DCT coefficients, determining a first shift value based on the class number and quantization number and a second shift value based on the class number and a combination type, and shifting the entire block of DCT coefficients based on the first and second shift values. Alternatively, the inverse quantization may be combined with inverse weighting step by pre-shifting a set of weighting tables, one for each area number combination. A pre-shifted weighting matrix is then selected based on the second shift value and multiplied by the shifted matrix of DCT coefficients. In another embodiment, a pre-shifted weighting table is selected based on the class number and combination type and then multiplied by the shifted matrix of DCT coefficients.

17 Claims, 12 Drawing Sheets

|   | 0 | 1 | 2 | 3 | 4 | 5 | 6 | 7 |
|---|---|---|---|---|---|---|---|---|
| 0 | DC | 0 | 0 | 1 | 1 | 1 | 2 | 2 |
| 1 | 0 | 0 | 1 | 1 | 1 | 2 | 2 | 2 |
| 2 | 0 | 1 | 1 | 1 | 2 | 2 | 2 | 3 |
| 3 | 1 | 1 | 1 | 2 | 2 | 2 | 3 | 3 |
| 4 | 1 | 1 | 2 | 2 | 2 | 3 | 3 | 3 |
| 5 | 1 | 2 | 2 | 2 | 3 | 3 | 3 | 3 |
| 6 | 2 | 2 | 2 | 3 | 3 | 3 | 3 | 3 |
| 7 | 2 | 2 | 3 | 3 | 3 | 3 | 3 | 3 |

Area numbers for 8x8 DCT

FIG. 4A

|   | 0 | 1 | 2 | 3 | 4 | 5 | 6 | 7 |
|---|---|---|---|---|---|---|---|---|
| 0 | DC | 0 | 1 | 1 | 1 | 2 | 2 | 3 |
| 1 | 0 | 1 | 1 | 2 | 2 | 2 | 3 | 3 |
| 2 | 1 | 1 | 2 | 2 | 2 | 3 | 3 | 3 |
| 3 | 1 | 2 | 2 | 2 | 3 | 3 | 3 | 3 |

|   | 0 | 1 | 2 | 3 | 4 | 5 | 6 | 7 |
|---|---|---|---|---|---|---|---|---|
| 4 | 0 | 0 | 1 | 1 | 2 | 2 | 2 | 3 |
| 5 | 0 | 1 | 1 | 2 | 2 | 2 | 3 | 3 |
| 6 | 1 | 1 | 2 | 2 | 2 | 3 | 3 | 3 |
| 7 | 1 | 2 | 2 | 3 | 3 | 3 | 3 | 3 |

Area numbers for 2x4x8 DCT

FIG. 4B

|  | Class Number | | | | Area Number | | | |
| --- | --- | --- | --- | --- | --- | --- | --- | --- |
|  | 0 | 1 | 2 | 3 | 0 | 1 | 2 | 3 |
| Quantization Number (QNO) | 15 |  |  |  | 1 | 1 | 1 | 1 |
|  | 14 |  |  |  | 1 | 1 | 1 | 1 |
|  | 13 |  |  |  | 1 | 1 | 1 | 1 |
|  | 12 | 15 |  |  | 1 | 1 | 1 | 1 |
|  | 11 | 14 |  |  | 1 | 1 | 1 | 1 |
|  | 10 | 13 |  | 15 | 1 | 1 | 1 | 1 |
|  | 9 | 12 | 15 | 14 | 1 | 1 | 1 | 1 |
|  | 8 | 11 | 14 | 13 | 1 | 1 | 1 | 2 |
|  | 7 | 10 | 13 | 12 | 1 | 1 | 2 | 2 |
|  | 6 | 9 | 12 | 11 | 1 | 1 | 2 | 2 |
|  | 5 | 8 | 11 | 10 | 1 | 2 | 2 | 4 |
|  | 4 | 7 | 10 | 9 | 1 | 2 | 2 | 4 |
|  | 3 | 6 | 9 | 8 | 2 | 2 | 4 | 4 |
|  | 2 | 5 | 8 | 7 | 2 | 2 | 4 | 4 |
|  | 1 | 4 | 7 | 6 | 2 | 4 | 4 | 8 |
|  | 0 | 3 | 6 | 5 | 2 | 4 | 4 | 8 |
|  |  | 2 | 5 | 4 | 4 | 4 | 8 | 8 |
|  |  | 1 | 4 | 3 | 4 | 4 | 8 | 8 |
|  |  | 0 | 3 | 2 | 4 | 8 | 8 | 16 |
|  |  |  | 2 | 1 | 4 | 8 | 8 | 16 |
|  |  |  | 1 | 0 | 8 | 8 | 16 | 16 |
|  |  |  | 0 |  | 8 | 8 | 16 | 16 |

|  | Class Number | | | | Area No. |
|---|---|---|---|---|---|
| | 0 | 1 | 2 | 3 | |
| Quantization Number (QNO) | 15 | | | | 1 |
| | 14 | | | | 1 |
| | 13 | | | | 1 |
| | 12 | 15 | | | 1 |
| | 11 | 14 | | | 1 |
| | 10 | 13 | | 15 | 1 |
| | 9 | 12 | 15 | 14 | 1 |
| | 8 | 11 | 14 | 13 | 1 |
| | 7 | 10 | 13 | 12 | 1 |
| | 6 | 9 | 12 | 11 | 1 |
| | 5 | 8 | 11 | 10 | 1 |
| | 4 | 7 | 10 | 9 | 1 |
| | 3 | 6 | 9 | 8 | 2 |
| | 2 | 5 | 8 | 7 | 2 |
| | 1 | 4 | 7 | 6 | 2 |
| | 0 | 3 | 6 | 5 | 2 |
| | | 2 | 5 | 4 | 4 |
| | | 1 | 4 | 3 | 4 |
| | | 0 | 3 | 2 | 4 |
| | | | 2 | 1 | 4 |
| | | | 1 | 0 | 8 |
| | | | 0 | | 8 |

FIG. 8A

| | Class Number | | | | Combo. Type |
|---|---|---|---|---|---|
| | 0 | 1 | 2 | 3 | |
| Quantization Number (QNO) | 15 | | | | 1 |
| | 14 | | | | 1 |
| | 13 | | | | 1 |
| | 12 | 15 | | | 1 |
| | 11 | 14 | | | 1 |
| | 10 | 13 | | 15 | 1 |
| | 9 | 12 | 15 | 14 | 1 |
| | 8 | 11 | 14 | 13 | 2 |
| | 7 | 10 | 13 | 12 | 3 |
| | 6 | 9 | 12 | 11 | 3 |
| | 5 | 8 | 11 | 10 | 4 |
| | 4 | 7 | 10 | 9 | 4 |
| | 3 | 6 | 9 | 8 | 3 |
| | 2 | 5 | 8 | 7 | 3 |
| | 1 | 4 | 7 | 6 | 4 |
| | 0 | 3 | 6 | 5 | 4 |
| | | 2 | 5 | 4 | 3 |
| | | 1 | 4 | 3 | 3 |
| | | 0 | 3 | 2 | 4 |
| | | | 2 | 1 | 4 |
| | | | 1 | 0 | 3 |
| | | | 0 | | 3 |

METHODS AND SYSTEMS FOR PERFORMING INVERSE QUANTIZATION AND INVERSE WEIGHTING OF DV VIDEO

This application claims the benefit of U.S. Provisional Application No. 60/176,257, filed Jan. 15, 2000.

BACKGROUND OF THE INVENTION

The present invention relates generally to methods and systems for performing faster encoding and decoding of digital video using media processors.

The market demand for popular entertainment and consumer electronic goods with more multimedia quality and functionality is pushing the development of multimedia technologies that compute faster and more efficiently. Because multimedia applications handle video and audio signals in real time, such applications can be slow to execute unless special-purpose devices are designed for the particular application. In today's market, however, multimedia technologies are changing rapidly due in part to changing standards and consumer tastes. Manufacturers therefore are constantly trying to develop low-cost, mass-market, high quality multimedia products that are also flexible enough to keep pace with changing standards and consumer tastes.

Many multimedia products employ a "media processor," a programmable processor that is capable of simultaneously processing several multimedia data types, such as video, audio, graphics, and communications because they offer quality and efficiency at a low price point for consumer goods. Media processors may employ various architectural strategies originally developed for supercomputers, such as parallel processing, a Single Instruction, Multiple Data (SIMD) architecture, very long instruction word (VLIW) execution, and vector processing to efficiently perform signal processing of image data. Another technique for improving media processors is to specially design the hardware therein to more efficiently perform time-intensive operations that are frequently required in multimedia applications.

Since video signals of multimedia applications constitute an enormous volume of data, it is common to use various methods for processing or "compressing" the data in video signals prior to transmission or storage. For example, one common format for compressing and storing digital video and audio signals is called the "DV format." The standard for DV format is described fully in the "Specification of Consumer-Use Digital VCRs (using a 6.3 mm magnetic tape)," issued by the HD Video Conference, December 1994. Devices employing the DV format encode digital video images by separating the pixels representing the image into blocks and processing the blocks using a mathematical technique known as a Discrete Cosine Transformation (DCT). The image is then represented in compressed form by mathematical components called DCT coefficients. In the DV format, a process known as "quantization" is used to reduce the precision of the DCT coefficients and thus further compress the data needed to represent the image. With quantization, the DCT coefficients for highly detailed portions of the image, which the human eye cannot readily perceive, are represented with less precision or effectively discarded, conserving the number of bits that are transmitted. DCT coefficients are quantized by dividing each DCT coefficient by a nonzero positive integer, called a "quantization step." Quantization step values are chosen so as to minimize perceived distortion in the reconstructed pictures.

During the decompression process, the decoder reverses the process to reconstruct approximations of the DCT coefficients. Both quantization and dequantization as traditionally implemented on conventional DV devices involve numerous large, computationally inefficient table lookups and multiply operations. It is therefore desirable to provide methods and apparatus for improving the efficiency of digital video devices employing quantization.

SUMMARY OF THE INVENTION

In accordance with the purpose of the present invention, as embodied and broadly described, the invention provides a method and apparatus for performing inverse quantization by determining class number and quantization number for each block of received quantized DCT coefficients, determining a first shift value based on the class number and quantization number and a second shift value based on the class number and a combination type, and entirely shifting the block of DCT coefficients based on the first and second shift values. Alternatively, the inverse quantization may be combined with inverse weighting step by pre-shifting a set of weighting tables, one for each area number combination. A pre-shifted weighting matrix is then selected based on the second shift value and multiplied by the shifted matrix of DCT coefficients. In another embodiment, a pre-shifted weighting table is selected based on the class number and combination type and then multiplied by the shifted matrix of DCT coefficients.

Additional drawings and features of the present invention will further become apparent to persons skilled in the art from the study of the following description and drawings.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Reference will now be made in detail to preferred implementations consistent with the present invention, examples of which are illustrated in the accompanying drawings. Wherever possible, the same reference numbers will be used throughout the drawings and the following description to refer to the same or like parts. This embodiment is described in sufficient detail to enable those skilled in the art to practice the invention and it is to be understood that other embodiments may be utilized and that structural changes may be made without departing from the scope of the present invention. The following detailed description, therefore, is not to be taken in a limited sense.

Figure 1:
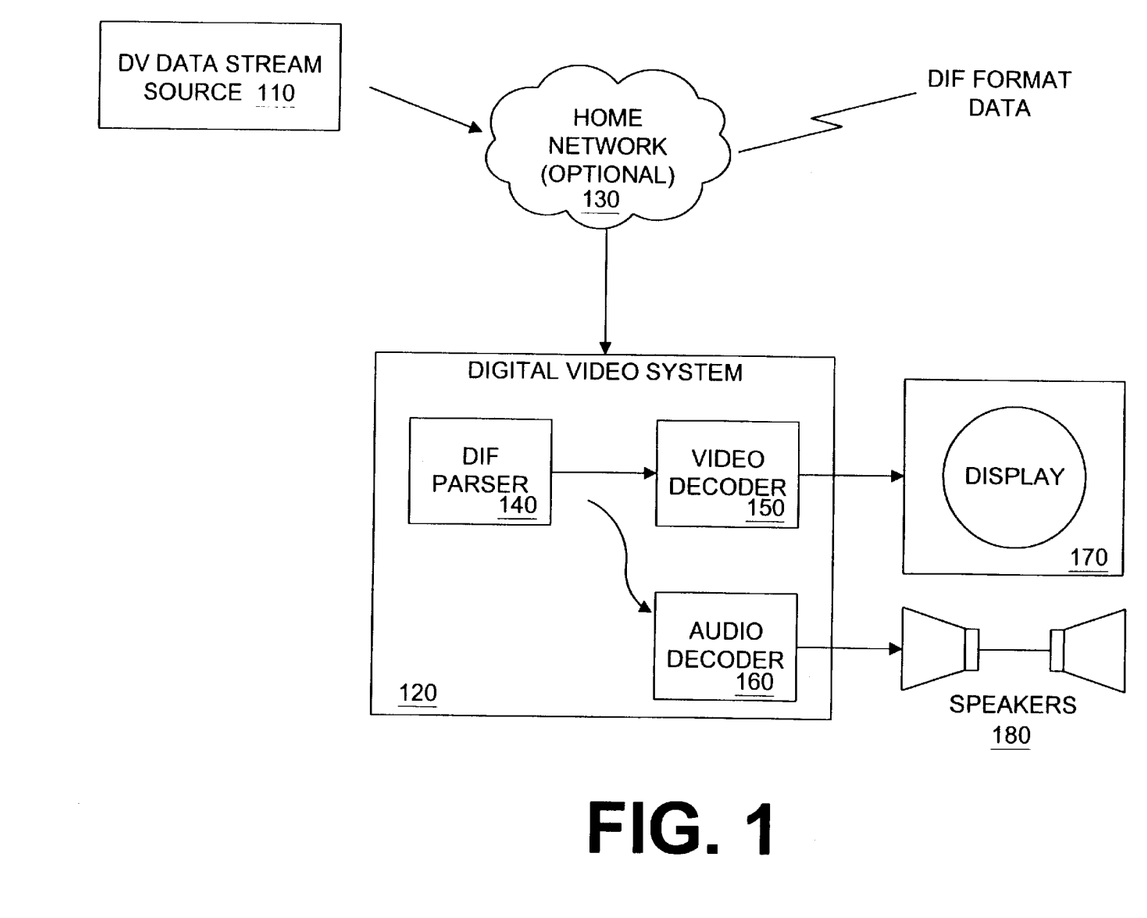
FIG. 1 is a diagram illustrating a DV system consistent with the present invention.
Figure 3:
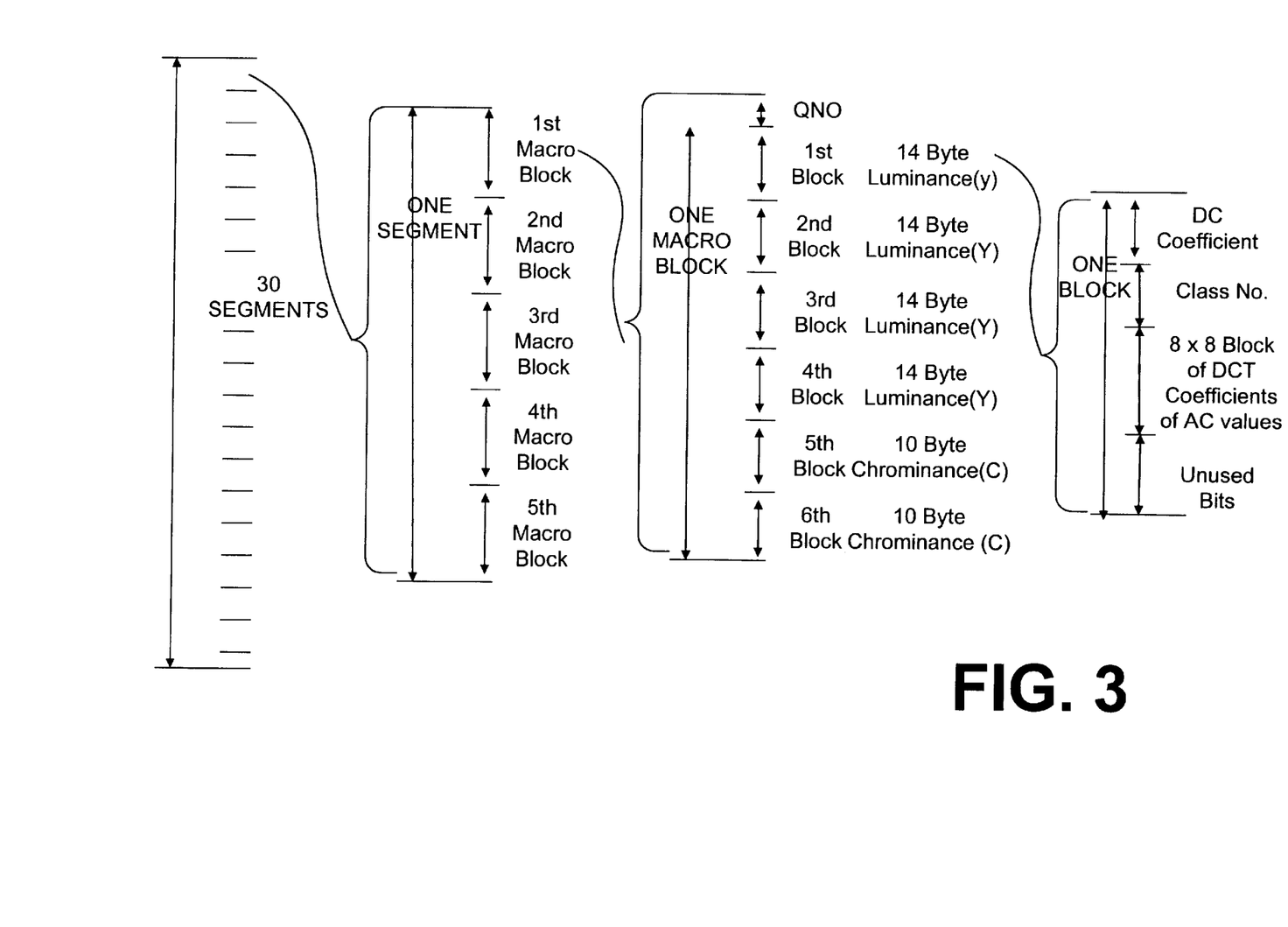
FIG. 3 illustrates one example of a frame of encoded DV video data in the DV format.

Referring now to the drawings, FIG. 1 shows one embodiment of a DV system consistent with the principles of the invention. A DV format data stream originates with a DV data stream source 110, such as a digital tape drive, digital television ("DTV"), interactive set-top box, DV camera or other digital video device that produces a DV stream. In one embodiment, the DV data stream is compliant with the DV standard. One example of data compliant with the DV standard is shown in FIG. 3. A DV data stream in DV format comprises, for example, video, audio, and system data. The video data within the DV data stream is obtained by encoding images for transmission. Methods for encoding image data to obtain a DV data stream are well known to those skilled in the art and will not be described in further detail.

For optional transmission over an IEEE 1394-compliant home network, the DV format data stream is divided and transmitted as digital interface format ("DIF") sequences. A DIF sequence in a IEEE 1394-compliant format is composed of an integral number of fixed length DIF blocks. Each DIF block comprises an identification header that specifies the type of the DIF block and its position in the DIF sequence.

The DV data stream may be passed through a home network 130 and received by a DV system 120. A DIF Parser 140 receives the DIF-formatted data and parses the DIF data from the data stream. After parsing, the resulting stream is separated into a DV video data stream, which is passed to a video decoder 150, and a DV audio data stream, which is passed to an audio decoder 160. Further information regarding the processing performed on the video information by video decoder 150 is described below with respect to FIG. 2. The audio data stream may be decoded by audio decoder 160 using any commonly known technique. Referring again to FIG. 1, the resulting video and audio are presented to a user by displaying resulting video on display 170 and playing audio on speakers 180.

Figure 2:
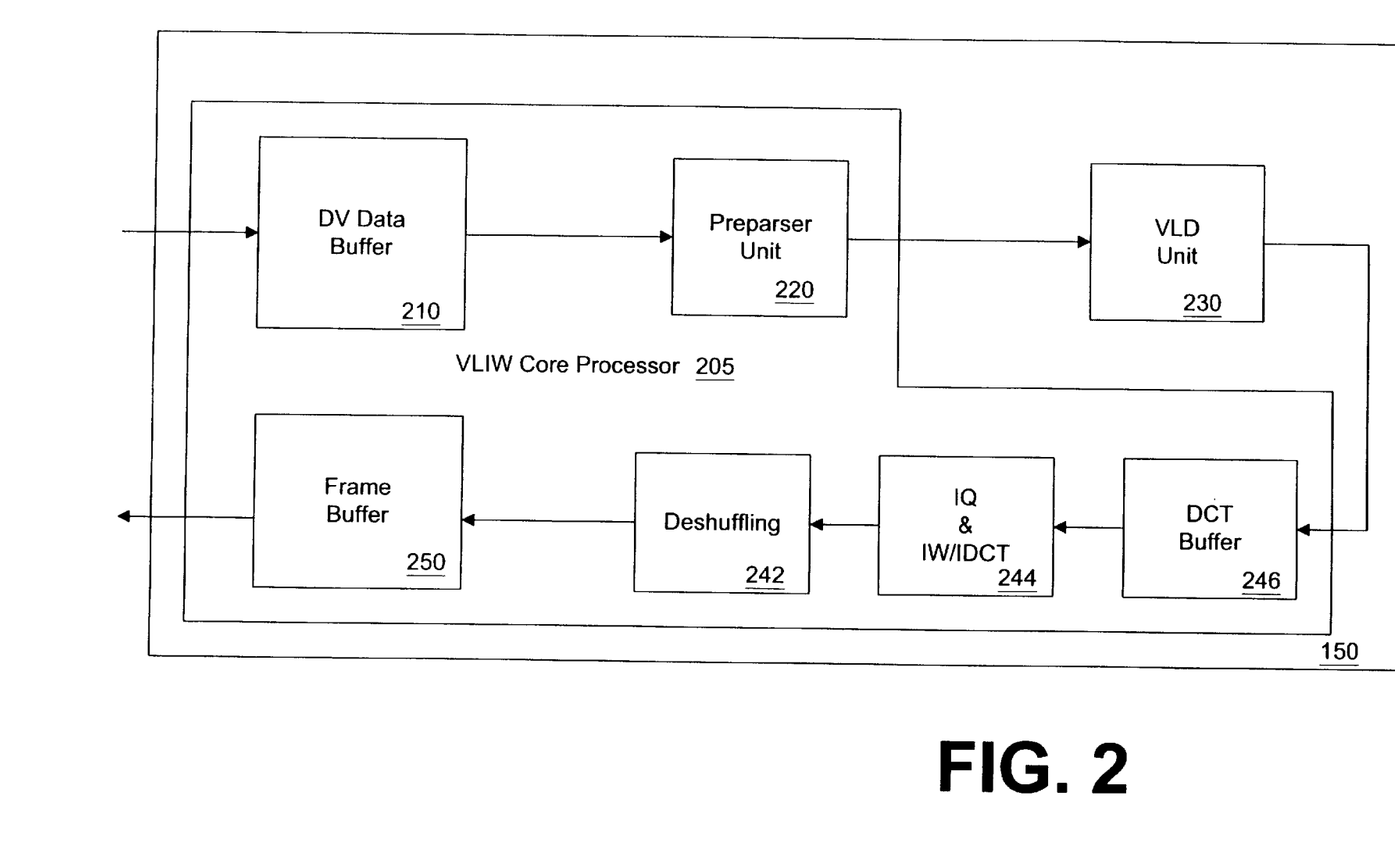
FIG. 2 is a diagram illustrating a DV video decoder 150 consistent with the present invention.

FIG. 2 shows an example of a video decoder 150. Video decoder 150 may comprise, for example, a Very Long Instruction Word ("VLIW") Core Processor 205 and a Variable Length Decoding ("VLD") unit 230. VLIW Core Processor 205 may may be programmed to perform as a Preparser Unit 220, a Deshuffling Unit 242, an Inverse Quantization/Inverse Weighting/Inverse DCT Unit 244, and a DCT Buffer 246. Input DV stream buffer 210 and output video frame buffer 250 can be held by internal or external memory.

As shown in FIG. 3, in one embodiment of the present invention, the video data stream comprises digital video frames, each frame comprising 30 segments, each segment of which comprises 5 macroblocks. Each macroblock comprises a quantization number ("QNO"), 4 luminance (Y) blocks of 14 bytes each, and 2 chrominance blocks of 10 bytes each. Each block comprises a set of fixed length information, specifically DC coefficients, that is, those that are constant within the block, and the class number for the block. Each block further comprises an 8 by 8 block of DCT coefficients corresponding to the discrete cosine transform (DCT) of the AC coefficients of the video image that is being represented. Within each block, the number of bits required to represent the DCT coefficients may vary widely depending on the quantization coding mode. Thus, a block may have space left over (shown as unused bits) within its fixed size allocation, or it may require additional space. According to the DV standard, all DCT coefficients in one video segment shall be arranged inside this segment by three passes.

Returning again to FIG. 2, DV video data stream is received by video decoder 150. In one embodiment of the present invention, the video data stream is stored in DV data buffer 210 of VLIW Core Processor 205. DV data buffer 210 may be internal memory or external memory, such as a SDRAM or SGRAM. The DV video data stream is passed to Preparser unit 220 for preparsing. Preparsing is reversing the DCT coefficient arrangement. In a multi-pass deframing process, each pass over the data stream finds the end of the blocks without decoding symbols within the blocks. Following multiple passes, all coefficient information is associated with its corresponding block in the video frame and the block information is passed to VLD unit 230. In a DV preparsing process according to one embodiment of the invention, variable length coefficient bits are recovered from the DV video data stream and associated back with their corresponding blocks. Preparsing may also obtain the class number and the quantization number of each macroblock.

In VLD unit 230, each block is decoded to obtain the DCT coefficients. The VLD unit transfers the DCT coefficients to DCT buffer 246. In one embodiment of the present invention, DCT buffer 246 is implemented as multiple buffers so that the VLIW and the VLD processes can operate concurrently. The DCT coefficients are passed to IQ&IW/IDCT Unit 244, which performs inverse quantization ("IQ") and inverse weighting/inverse DCT on the data in DCT Buffer 246. The resulting data is passed to Deshuffling Unit 242, which deshuffles the data and outputs it to Frame Buffer 250, from which it can be readily displayed.

In one embodiment of the present invention, both the IQ and IW/IDCT processes performed by unit 244 are performed sequentially on a VLIW architecture. When performed sequentially on a VLIW architecture, the data is subjected to inverse quantization following by inverse weighting and finally IDCT. In other embodiments of the present invention, the IQ and IW processes are combined.

Inverse quantization in conventional systems is typically performed by loading a large quantizer scale matrix and multiplying the DCT coefficients by the values in the quantizer scale matrix. In one block, each DCT coefficient is treated individually by its area number therefore, using conventional methods, it is difficult to achieve parallel computing. In methods and systems consistent with the present invention, the process of performing inverse quantization may be streamlined and more efficiently implemented by using smaller look-up tables or matrices in conjunction with simple bit shifting operations, which lend themselves to parallel implementations.

In conventional implementations of the DV standard, DV video is encoded and decoded in the following manner.

Figure 4A:
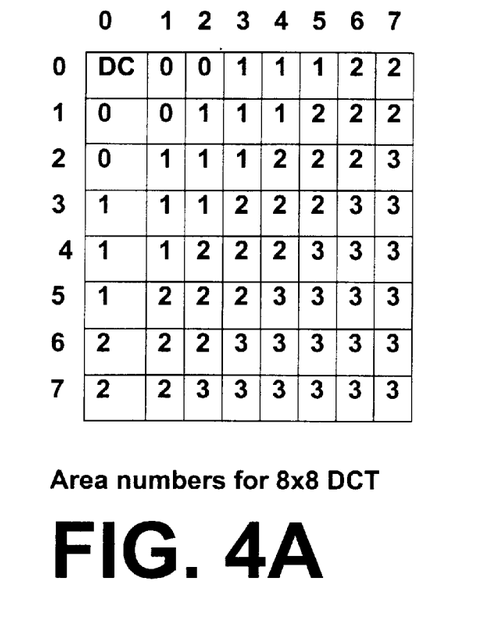
FIG. 4A shows a table for determining area numbers for an 8×8 DCT coefficient matrix.
Figure 4B:
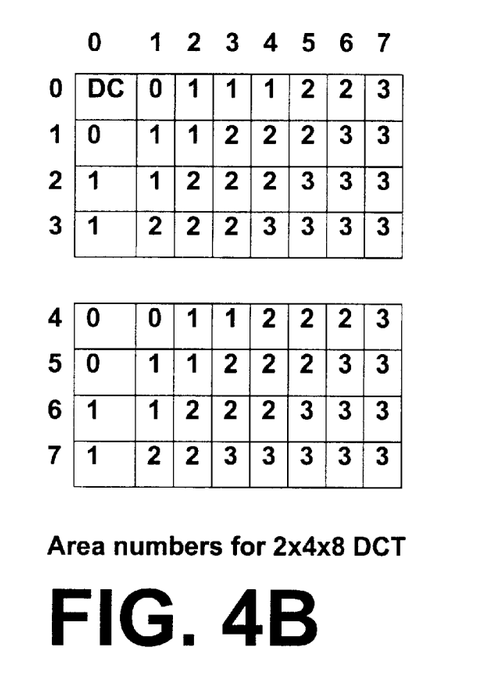
FIG. 4B shows a table for determining an area number for a 2×4×8 DCT coefficient matrix.

Image frames consist of a large number of picture elements, or "pixels," arranged in a rectangular matrix of m columns and n rows. Each frame may be divided up into blocks of pixels called "blocks" and groups of blocks referred to as "macroblocks." During the DV encoding process, each block is encoded using either an 8×8 DCT or 2×4×8 DCT to produce a block of DCT coefficients. The DCT coefficients are then weighted using corresponding predetermined weights depending on the DCT mode. Each block of weighted DCT coefficients is then classified into one of four "classes" based on the level of quantization noise and maximum absolute value of the AC coefficients. These "class numbers" may be 0, 1, 2, or 3. Each coefficient within the block of DCT coefficients is assigned an "area number," ranging from 0 to 3. FIG. 4A shows the assignment of area numbers to each coefficient in a DCT coefficient matrix if an 8×8 DCT is used; FIG. 4B shows the assignment if a 2×4×8 DCT is implemented.

Figure 5:
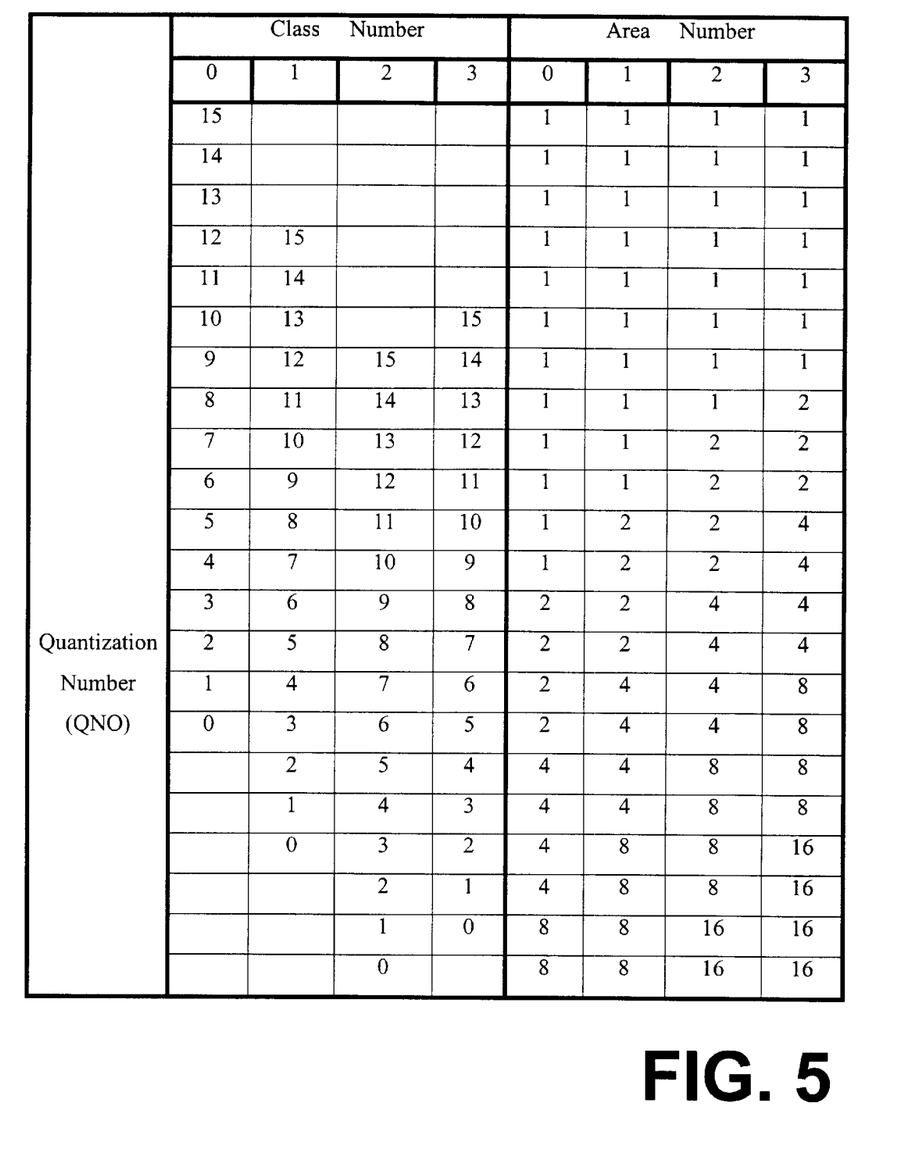
FIG. 5 shows a table for determining quantization step as employed by the DV standard.

The DCT coefficients are subjected to "quantization" to further compress the amount of stored and transmitted data. During quantization, each of the DCT coefficients is divided by a quantization step, chosen based on the class number, area number and quantization number ("QNO"). In the DV format, QNO is chosen so as to limit the amount of data in one video segment to five compressed macroblocks. In the DV standard, the quantization step for DV is chosen using the table shown in FIG. 5. For example, referring now to FIG. 5, if a particular block has class number "1" and it is determined that a QNO of "8" is needed to limit the amount of data in one video segment to the desired number of macroblocks, then the quantization step will be one of the four numbers of the combination (1, 2, 2, 4) appearing in the table on the same row as the number "8" for class number "1" depending on the area number. Referring to FIG. 4A, if the current DCT coefficient is (4, 5) and an 8×8 DCT was used to obtain this coefficient, we find the area number for DCT coefficient (4, 5), which is "3". Referring back to FIG. 5, the quantization step for DCT coefficient (4,5) will be 4, that is, the entry corresponding to an area number of "3." DCT coefficient (4,5) will then be divided by the quantization step of 4 to reduce the amount of information that needs to be stored. Those skilled in the art will recognize that dividing a digital number by 4 is equivalent to shifting the number two places to the right.

Figure 6:
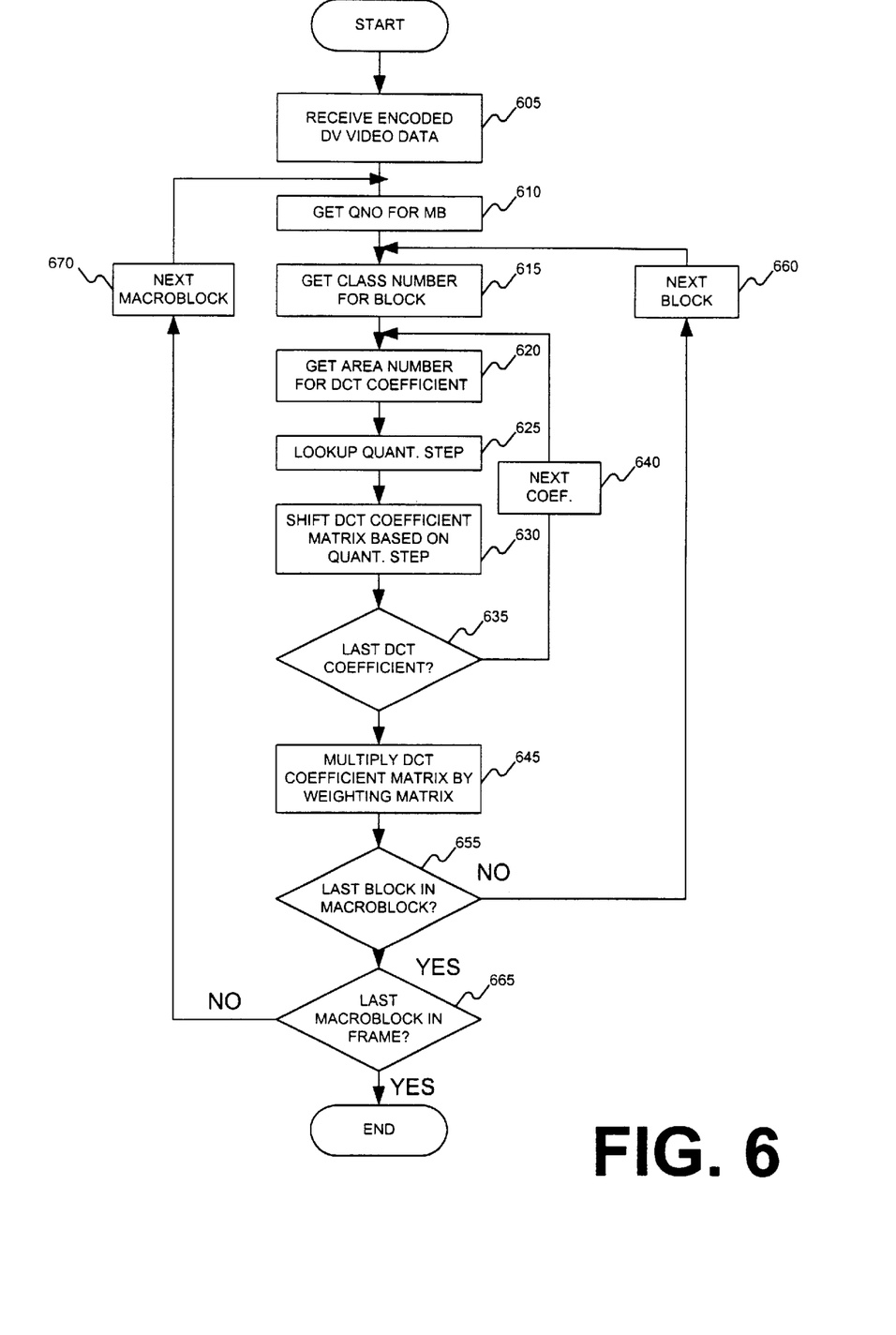
FIG. 6 shows a flow chart illustrating the steps of one method of performing inverse quantization and inverse weighting according to the DV standard.

The decoding process in the DV standard is essentially the reverse of the encoding process described above. FIG. 6 is a flow chart showing the steps of the inverse quantization and inverse weighting processes of the DV standard. Encoded DV video data is received in a DV format, such as-is shown in FIG. 3 (step 605). The encoded DV video data comprises the DCT coefficients as well as the QNO for each macroblock and the class number for each block. The QNO for the current macroblock is obtained from the DV video data (step 610). Then, for each block in the macroblock, the class number is obtained (step 615). For each DCT coefficient, as in the encoding process, the area number for is determined by consulting a table such as the tables shown in FIGS. 4A and 4B (step 620). Based on the QNO, class number, and area number, the quantization step for each DCT coefficient may be determined by look-up using a table such as the one shown in FIG. 5 (step 625). The DCT coefficient is then shifted in the opposite direction from the encoding process based on the quantization step (step 630). This process is repeated for each DCT coefficient (steps 635 & 640). The quantized DCT coefficient matrix is then multiplied by the corresponding weighting matrix to achieve inverse weighting (step 645). This process is repeated for each block in the macroblock (steps 655 and 660) and each macroblock in the frame (steps 665 and 670).

One skilled in the art will recognize that the conventional method for implementing the DV standard is computationally intensive. As shown in FIG. 6, this conventional implementation requires at least one lookup per DCT coefficient in a block, and one matrix multiply per block in a macroblock. Using the traditional configuration of DV format video as shown in FIG. 3, processing the whole video segment will require at least, ((8×8)−1)×6×5=1890 table lookups and 30 matrix multiplies.

In methods and systems consistent with the present invention, computational complexity is reduced by using smaller table lookups and bit shifting operations to replace some lookup and matrix multiply operations.

Figure 7:
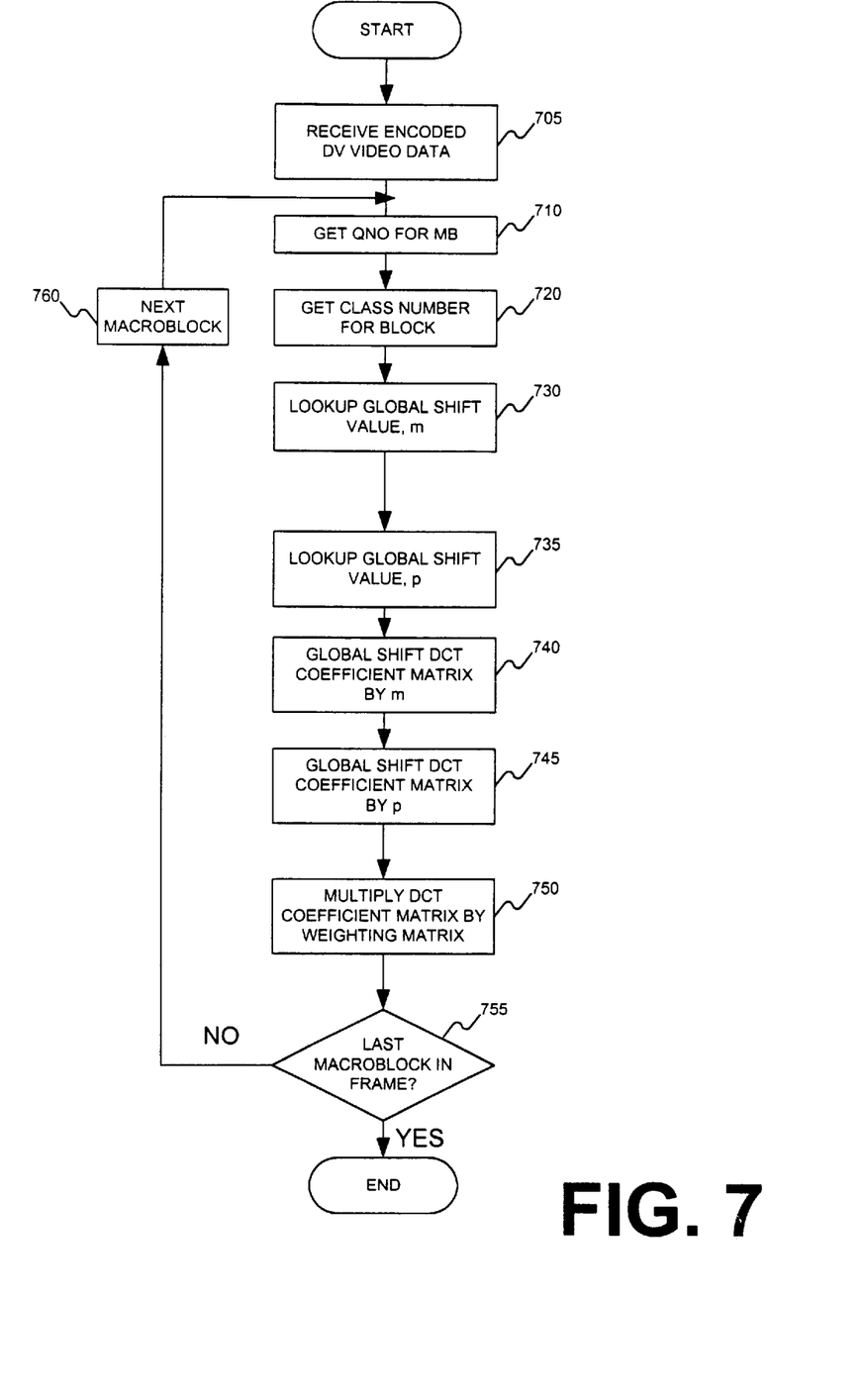
FIG. 7 is a flow chart illustrating the steps of one exemplary method for performing inverse quantization and inverse weighting consistent with the principles of the present invention.

FIG. 7 is a flow chart showing the steps of one method for performing inverse quantization and inverse weighting consistent with the present invention. Encoded DV data is received in a DV format, as is shown, for example, in FIG. 3 (step 705). As in the example above, the encoded DV data comprises the DCT coefficients as well as the QNO for each macroblock and the class number for each block. The QNO for the current macroblock is obtained from the encoded DV video data (step 710). Then, for each block in the macroblock, the class number is obtained (step 720). Then, instead of processing each DCT coefficient separately, the DCT coefficient matrix is processed as a group by determining two global shift values, m and p (steps 730 and 735), shifting the DCT coefficient matrix entirely by the two shift values (steps 740 and 745), and multiplying the DCT coefficient by the weighting matrix (step 750).

Figure 8A:
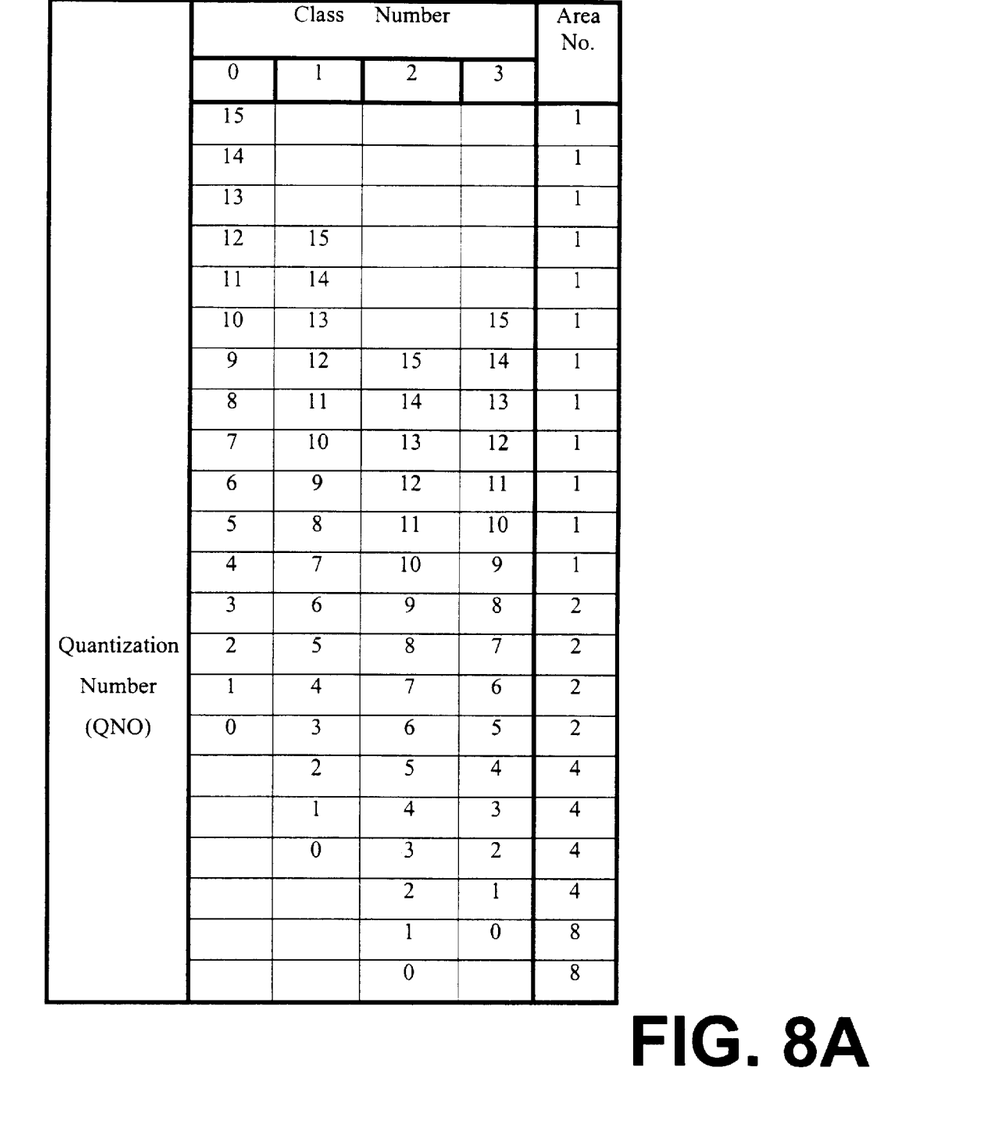
FIG. 8A shows a first table for determining quantization step consistent with the principles of the present invention.

The first global shift value, m, is determined by using the table in FIG. 8A. The table in FIG. 8A is generated by reducing the table in FIG. 5 to the first 4 columns, plus one column representing a multiplier, n. This can be done because, as one can see from the table in FIG. 5, there are only four combinations of quantization steps possible in the DV format and the remaining choices are multiples of the first four combinations. For example, looking at the last four columns of FIG. 5, under the heading "Area Number" and sub-headings 0, 1, 2, and 3, and treating each line of four values as an array, the four possible combinations of quantization steps may be represented as (1, 1, 1, 1), (1, 1, 1, 2), (1, 1, 2, 2), and (1, 2, 2, 4). Those skilled in the art will recognize that if n equals the quantization step, that is, the number that will be used to multiply (in the decoding process) or divide (in the encoding process) the DCT coefficients, then m equals the number places that the DCT coefficients will be shifted, since n={1, 2, 4, or 8}=$2^m$. The large look-up table in FIG. 5 may therefore be replaced by a smaller look-up table consisting of the first four columns of FIG. 5 and a factor, n.

In step 720, FIG. 8A is used to determine a first shift value, m, when implementing methods consistent with the present invention. For example, the class number and QNO for the macroblock is used to determine a line in the table in FIG. 8A. The number on that line, n, then determines the first global shift value, m, since n=$2^m$ (step 720).

Figure 8B:
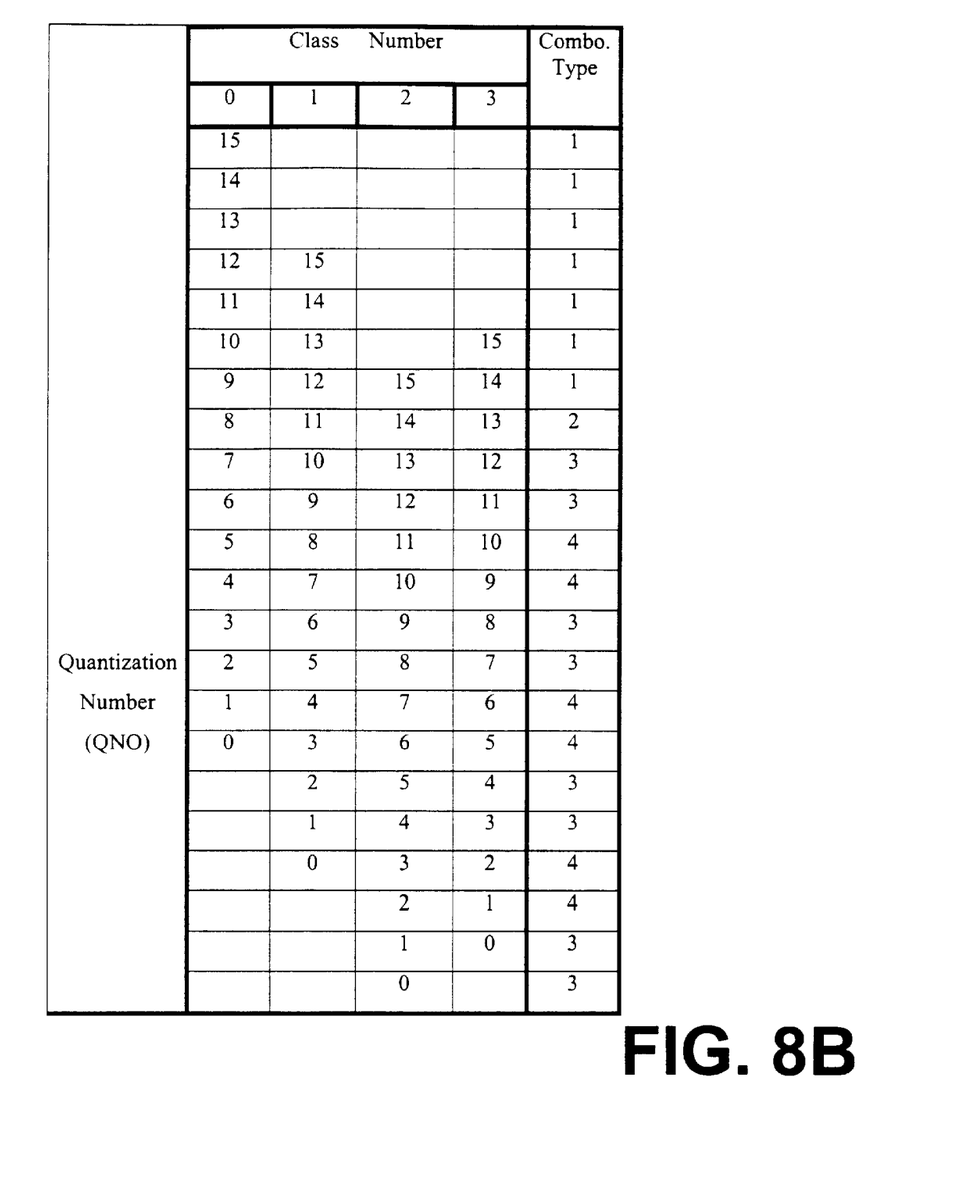
FIG. 8B shows a second table for determining quantization step consistent with the present invention.

The table shown in FIG. 8B is used to determine a second global shift value, p. (step 730). The table in FIG. 8B generally corresponds to the first 4 columns of the table in FIG. 5, plus a fifth column representing the combination type. "Combination types" (1, 2, 3, 4) refer to the four possible combinations of quantization steps as (1, 1, 1, 1), (1, 1, 1, 2), (1, 1, 2, 2), and (1, 2, 2, 4), respectively.

To determine the second global shift value, p, the class number and QNO for the macroblock is used to determine a line in the table in FIG. 8B. The combination type number on that line represents one of the four possible combinations. If the combination type is "3," for example, the combination (1,1,2,2) is used. The second shift value is determined based on the selected combination and the area number (step 735). For example, if the combination (1, 1, 2, 2) is selected and the area number is "3," the value in the $3^{rd}$ position from the left to determine the second shift value, p, where $2^p$ is the divisor.

Once global shift values, m and p, are determined, the DCT coefficient matrix is entirely shifted by m (step 740) and p (step 745). The resulting DCT coefficient matrix is multiplied by the weighting matrix (step 750). This process is performed for each macroblock in the frame (step 755).

Figure 9:
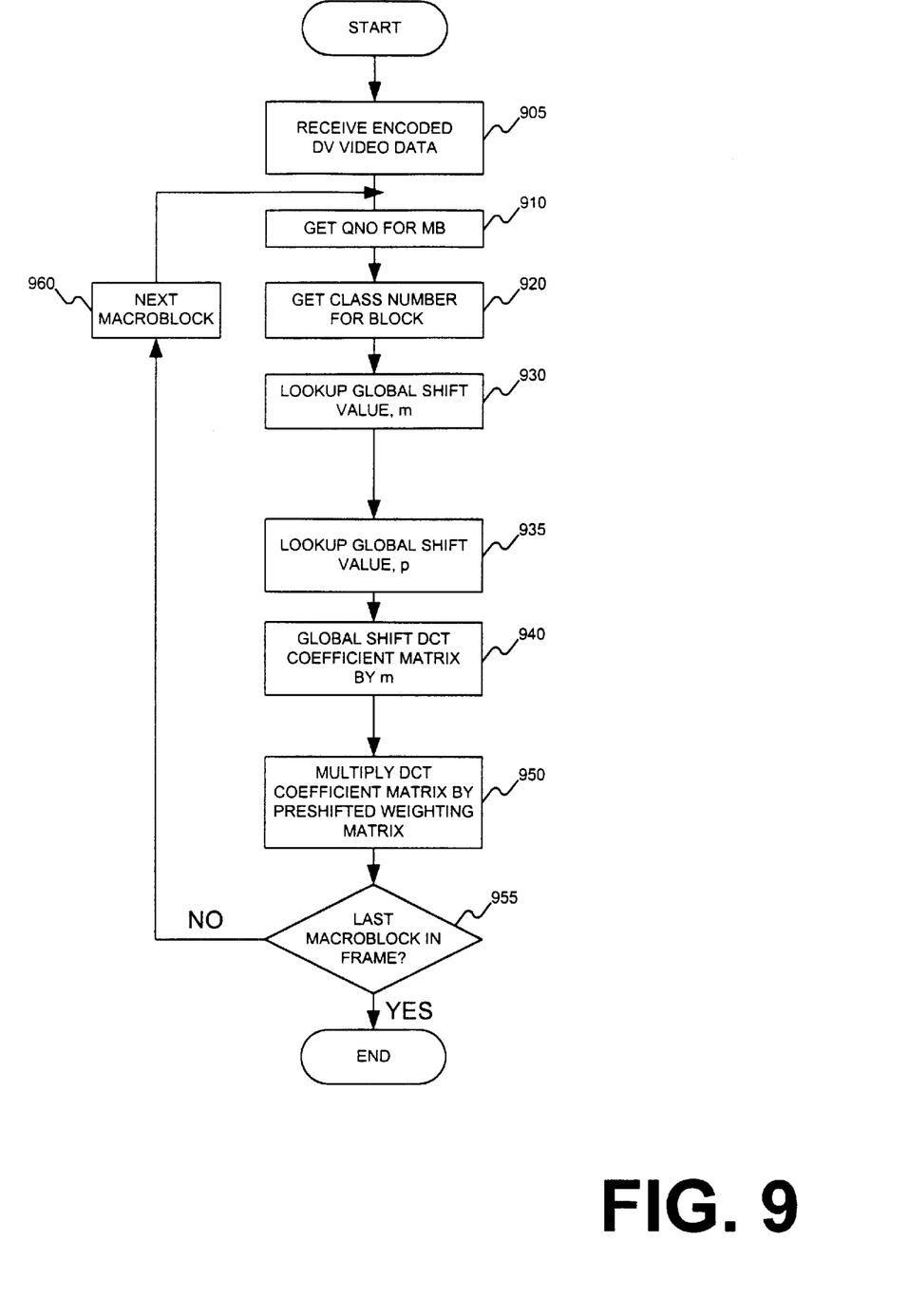
FIG. 9 is a flow chart illustrating the steps of one exemplary method for performing inverse quantization and inverse weighting consistent with the principles of the present invention.

In another embodiment consistent with the present invention, the second global shift (step 745) may be combined with inverse weighting (step 750) to eliminate more steps and machine operations. For a given element in a weighting matrix, a pre-shifted value is selected from these four possible shift values by an element's area number. In this embodiment, the weighting matrix is pre-shifted by each of the four possible shift values and stored. There will be four pre-shifted weighting matrices, one for each combination. Since there are two DCT modes, 2×4×8 and 8×8, each of which uses different weighting tables, it may be necessary to store 8 different pre-shifted, reordered weighting tables, 4 for each mode. FIG. 9 is a flow chart showing the steps of a method implementing this embodiment. One can see that steps 905, 910, 920, 930, 935, and 940, are identical to steps 705, 710, 720, 730, 735, and 740 of FIG. 7. In FIG. 9, however, step 950 replaces steps 745 and 750 in FIG. 7. In step 950, one of the four pre-shifted weighting matrices is selected based on the second shift value, p. The entirely shifted DCT coefficient matrix is then multiplied by the selected pre-shifted weighting matrix. This embodiment of the present invention therefore requires only two (2) lookups, one (1) global shift and one (1) matrix multiply per block for a total of 60 lookups, 30 global shifts, and 30 matrix multiplies per segment.

Figure 10:
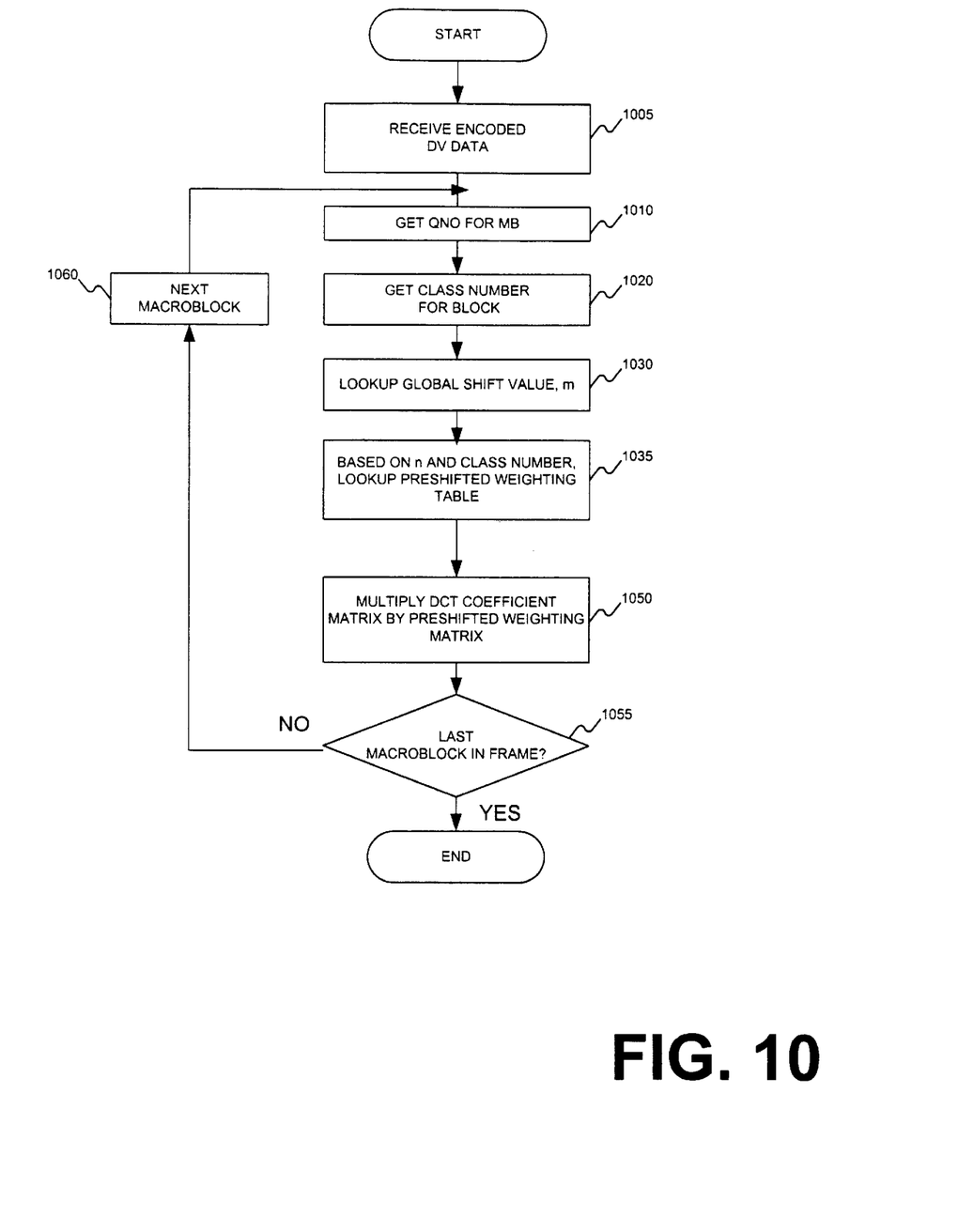
FIG. 10 is a flow chart illustrating the steps of one exemplary method for performing inverse quantization and inverse weighting consistent with the principles of the present invention.

FIG. 10 shows the steps of yet another embodiment consistent with the present invention, where the sixteen possible combinations of pre-shifted weighting tables are stored at initialization. In FIG. 10, steps 1005, 1010, 1020 and 1030 are identical to steps 905, 910, 920, and 930, however, step 1035 replaces both steps 935 and 940 of FIG. 9. In step 1035, the global shift value determined in step 1030 and the class number are used to lookup a pre-shifted weighting table. The DCT coefficient matrix is then multiplied by the selected pre-shifted weighting table (step 1050).

In some embodiments of the present invention, the pre-shifted weighting tables are also reordered depending, for example, on the method of performing DCT and IDCT used in the DV system. Many fast methods of performing DCT and IDCT on media processors reorder the data for use with a VLIW Core Processors. The pre-shifted weighting tables may need to be reordered accordingly.

As mentioned earlier, DV has two DCT modes, 2×4×8 and 8×8, each of which uses different weighting tables. Therefore, for FIG. 10, there can actually be 32 different pre-shifted, reordered weighting tables, 16 for each mode.

Figure 11:
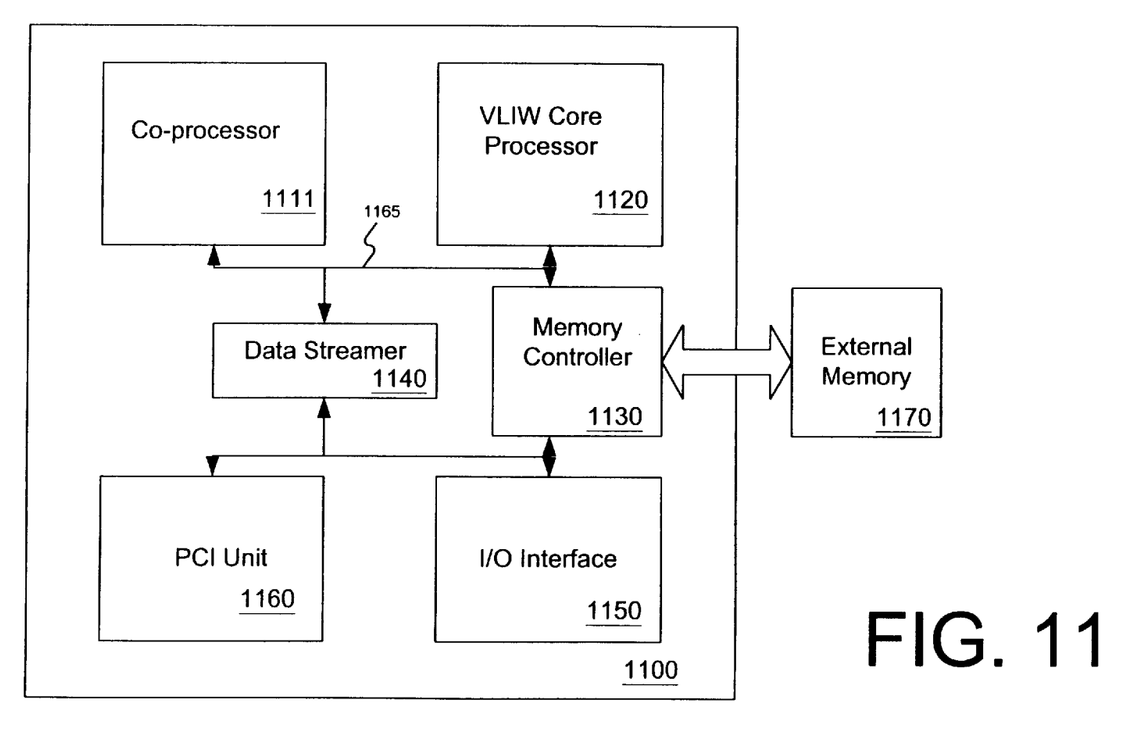
FIG. 11 shows an exemplary media processor 1100 on which principles of the present invention may be implemented.

FIG. 11 shows an apparatus for performing inverse quantization consistent with the present invention. One embodiment of the present invention is implemented on a media processor 1100 with VLIW execution. Available media processors with VLIW execution include, for example, the MAP Series media processors from Equator Technologies (Seattle, Wash.), including the MAP-CA media processor jointly developed by MAP1000 Equator Technologies, Inc (ETI) and Hitachi Ltd (HITACHI), and other similar devices.

As shown in FIG. 11, media processor 1100 comprises a co-processor 1111, VLIW Core Processor 1120, memory controller 1130, data streamer 1140, I/O interface 1150, and PCI unit 1160, operatively connected by an internal bus 1165. Media processor 1100 may also be operatively connected to an external memory 1170.

Co-processor 1111 comprises one or more co-processors that execute in parallel with VLIW Core Processor 1120. Co-processor 1111 may comprise, for example, a Variable Length Encoder/Decoder ("VLx") processor, such as a 16-bit RISC co-processor with multiple 16-bit registers that offload VLIW CPU 522 from bit sequential tasks of variable length encoding and decoding. Co-processor 1111 may also comprise, for example, a video scalar co-processor.

VLIW Core Processor 1120 comprises a central processing unit ("CPU") and multiple interger-arithmetic logic units ("I-ALU") and integer, graphics-arithmetic logic units ("IFG-ALU"). Multiple logic units allow the VLIW Core Processor to execute instructions in parallel. Preferably, VLIW Core Processor 1120 is configured to allow partitioned Single Instruction Multiple Data (SIMD) operations. VLIW Core Processor 1120 may also be equipped with an instruction cache and data cache used for caching instructions and data from external memory 1105.

Memory controller 1130 controls external memory 1170, which may be, for example, a Synchronous Dynamic Random Access Memory ("SDRAM") or Sychronous Graphic Random Access Memory ("SGRAM"). Memory 1170 may contain instructions for causing processor 1100 to execute the methods of FIGS. 7, 9, and 10.

Data streamer 1140 is a programmable hardware unit similar in function to a direct memory access ("DMA") unit. Data streamer 1140 reduces cache miss rate by pre-loading a data cache in order to enhance the performance of VLIW Core Processor 1120. Data streamer 1140 initiates transfers to and from memory with minimum CPU overhead thereby facilitating parallel execution with VLIW Core Processor 1120. Data streamer 1140 also supports DMA transfers up to 64 channels and enables 32 memory-to-memory transfers.

I/O Interface 1150 transforms the decoded data into analog output data in, for example, NTSC format. Peripheral Component Interconnect ("PCI") unit 1160 allows VLIW interface 1120, Data Streamer 1140, and Co-processor 1111 to initiate bus requests. PCI is a 64-bit bus, though it may be implemented as a 32-bit bus. It can run at clock speeds of 33 or 66 MHz.

Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet.

Disclosed herein are various alternative embodiments of, and alternative designs for, the invention. The invention, however, should not be taken as being limited to the embodiments and alternatives described. One skilled in the art will recognize various alternative embodiments and changes in form and detail that may be employed while practicing the invention without departing from its principles, spirit or scope. For example, the reverse of this invention may be used to perform quantization in a DV encoder.

We claim:

1. A method for performing inverse quantization of digital video data comprising:
   receiving a block of quantized DCT coefficients corresponding to a digital video image;
   determining a class number and a quantization number for the block of quantized DCT coefficients;
   determining a first shift value based on the class number and quantization number and a second shift value based on the class number and a combination type;
   shifting the entire block of DCT coefficients based on the first and second shift values; and
   outputting a dequantized block of DCT coefficients.

2. A method for performing inverse quantization and inverse weighting of digital video data comprising the steps of:
   receiving a block of quantized DCT coefficients corresponding to a digital video image;
   determining a class number and a quantization number for the block of quantized DCT coefficients;
   determining a first shift value based on the class number and quantization number and a second shift value based on the class number and a combination type;
   shifting the entire block of DCT coefficients based on the first shift value;
   selecting a weighting matrix based on the second shift value;
   multiplying the block of DCT coefficients by the selected pre-shifted weighting matrix; and
   outputting a dequantized block of DCT coefficients.

3. The method of claim 2, further comprising:
   of the set of DCT coefficients; and wherein the inverse weighting matrix is selected based on the second shift value and the DCT mode.

4. A method for performing inverse quantization and inverse weighting of digital video data comprising:
   receiving a block of quantized DCT coefficients corresponding to a digital video image;
   determining a class number and a quantization number for the block of quantized DCT coefficients;
   determining a first shift value based on the class number and quantization number;
   shifting the entire block of DCT coefficients based on the first shift value;
   selecting a pre-shifted weighting matrix based on the class number and a combination type;
   multiplying the block of DCT coefficients by the selected pre-shifted weighting matrix; and
   outputting a dequantized block of DCT coefficients.

5. The method of claim 4, further comprising the steps of:
   determining a DCT mode of the set of DCT coefficients; and wherein the pre-shifted inverse weighting matrix is selected based on the class number, the combination type, and the DCT mode.

6. An inverse quantization apparatus comprising:
   means for receiving a block of quantized DCT coefficients corresponding to a digital video image;
   means for determining class number and quantization number for the block of quantized DCT coefficients;
   means for determining a first shift value based on the class number and quantization number and a second shift value based on the class number and a combination type;
   means for shifting the entire block of DCT coefficients based on the first and second shift values; and
   means for outputting a dequantized block of DCT coefficients.

7. An inverse quantization and inverse weighting apparatus comprising:
   means for receiving a block of quantized DCT coefficients corresponding to a digital video image;
   means for determining a class number and a quantization number for the block of quantized DCT coefficients;
   means for determining a first shift value based on the class number and quantization number and a second shift value based on the class number and a combination type, wherein the combination type;
   means for shifting the entire block of DCT coefficients based on the first shift value;
   means for selecting a pre-shifted inverse weighting matrix based on the second shift value;
   means for multiplying the block of DCT coefficients by the selected pre-shifted weighting matrix; and
   means for outputting a dequantized block of DCT coefficients.

8. The apparatus of claim 7, further comprising:
   means for determining a DCT mode of the set of DCT coefficients; and wherein the means for selecting a pre-shifted inverse weighting matrix further includes means for selecting a pre-shifted inverse weighting matrix based on the second shift value means and the DCT mode.

9. An inverse quantization and inverse weighting apparatus comprising:
   means for receiving a block of quantized DCT coefficients corresponding to a digital video image;
   means for determining class number and quantization number for the block of quantized DCT coefficients;
   means for determining a first shift value based on the class number and quantization number;
   means for shifting the entire block of DCT coefficients based on the first shift value;
   means for selecting a pre-shifted weighting matrix based on the class number and a combination type;
   means for multiplying the block of DCT coefficients by the selected pre-shifted weighting matrix; and
   means for outputting a dequantized block of DCT coefficients.

10. The method of claim 9, further comprising:
    means for determining a DCT mode of the set of DCT coefficients; and wherein the pre-shifted inverse weighting matrix is selected based on the class number, the combination type, and the DCT mode.

11. A computer-readable medium capable of causing a computer system to perform a method comprising:
    receiving a block of quantized DCT coefficients corresponding to a digital video image;
    determining class number and quantization number for the block of quantized DCT coefficients;
    determining a first shift value based on the class number and quantization number and a second shift value based on the class number and a combination type;
    shifting the entire block of DCT coefficients based on the first and second shift values; and
    outputting a dequantized block of DCT coefficients.

12. A computer-readable medium capable of causing a computer system to perform a method comprising the steps of:

receiving a block of quantized DCT coefficients corresponding to a digital video image;

determining class number and quantization number for the block of quantized DCT coefficients;

determining a first shift value based on the class number and quantization number and a second shift value based on the class number and a combination type, wherein the combination type;

shifting the entire block of DCT coefficients based on the first shift value;

selecting a pre-shifted weighting matrix based on the second shift value;

multiplying the block of DCT coefficients by the selected pre-shifted weighting matrix; and outputting a dequantized block of DCT coefficients.

13. The medium of claim 12, wherein the medium is further capable of causing a computer system to perform the steps of:

determining a DCT mode of the set of DCT coefficients; and wherein the pre-shifted inverse weighting matrix is selected based on the second shift value and the DCT mode.

14. A computer-readable medium capable of causing a computer system to perform a method comprising the steps of:

receiving a block of quantized DCT coefficients corresponding to a digital video image;

determining class number and quantization number for the block of quantized DCT coefficients;

determining a first shift value based on the class number and quantization number;

shifting the entire block of DCT coefficients based on the first shift value;

selecting a pre-shifted weighting matrix based on the class number and a combination type;

multiplying the block of DCT coefficients by the selected pre-shifted weighting matrix; and outputting a dequantized block of DCT coefficients.

15. The medium of claim 14, wherein the medium is further capable of causing a computer system to perform the steps of:

determining a DCT mode of the set of DCT coefficients; and wherein the pre-shifted inverse weighting matrix is selected based on the class number, the combination type, and the DCT mode.

16. A system for performing inverse quantization comprising:

input/output interface unit for receiving a block of quantized DCT coefficients corresponding to a digital video image; and a processing unit for determining class number and quantization number for the block of quantized DCT coefficients;

determining a first shift value based on the class number and quantization number and a second shift value based on the class number and a combination type; and shifting the entire block of DCT coefficients based on the first and second shift values.

17. A system for performing inverse quantization comprising:

input/output interface unit for receiving a block of quantized DCT coefficients corresponding to a digital video image;

a memory for storing a set of pre-shifted weighting matrices; and a VLIW processing unit for determining class number and quantization number for the block of quantized DCT coefficients;

determining a first shift value based on the class number and quantization number and a second shift value based on the class number and a combination type, wherein the combination type;

shifting the entire block of DCT coefficients based on the first shift value; and selecting based on the second shift value a pre-shifted weighting matrix from the set of pre-shifted weighting matrices; and multiplying the block of DCT coefficients by the selected pre-shifted weighting matrix.

* * * * *